(12) United States Patent
Deng et al.

(10) Patent No.: US 11,340,408 B2
(45) Date of Patent: May 24, 2022

(54) GROUNDABLE FIBER CONNECTOR

(71) Applicant: LEONI KABEL GMBH, Roth (DE)

(72) Inventors: Juntao Deng, Jiangsu (CN); Bolin Jiang, Guangdong (CN); Qi Huang, Anhui (CN); Marcus Bloom-Pflug, Neu-Ulm (DE)

(73) Assignee: Leoni Kabel GmbH

( * ) Notice: Subject to any disclaimer, the term of this patent is extended or adjusted under 35 U.S.C. 154(b) by 0 days.

(21) Appl. No.: 16/978,149

(22) PCT Filed: Mar. 13, 2018

(86) PCT No.: PCT/CN2018/078854
§ 371 (c)(1),
(2) Date: Sep. 3, 2020

(87) PCT Pub. No.: WO2019/173968
PCT Pub. Date: Sep. 19, 2019

(65) Prior Publication Data
US 2021/0199898 A1 Jul. 1, 2021

(51) Int. Cl.
*G02B 6/38* (2006.01)
(52) U.S. Cl.
CPC ......... *G02B 6/3869* (2013.01); *G02B 6/3825* (2013.01); *G02B 6/3831* (2013.01)
(58) Field of Classification Search
CPC ... G02B 6/3869; G02B 6/3825; G02B 6/3831
USPC .......................................................... 385/78
See application file for complete search history.

(56) References Cited

U.S. PATENT DOCUMENTS

| | | | | |
|---|---|---|---|---|
| 4,772,212 A | * | 9/1988 | Sotolongo | H01R 12/775 439/98 |
| 4,820,201 A | * | 4/1989 | Van Brunt | H01R 13/6592 439/607.3 |
| 6,450,697 B1 | | 9/2002 | Ngo | |
| 2002/0126967 A1 | * | 9/2002 | Panak | H04B 10/1127 385/101 |
| 2013/0089290 A1 | * | 4/2013 | Sloey | G02B 6/4204 385/74 |

(Continued)

FOREIGN PATENT DOCUMENTS

| | | |
|---|---|---|
| CN | 102854579 | 1/2013 |
| CN | 203117471 | 8/2013 |

(Continued)

OTHER PUBLICATIONS

International Search Report and Written Opinion of the International Search Authority for PCT/CN2018/078854, State Intellectual Property Office of the P.R.China, Dec. 17, 2018.

(Continued)

*Primary Examiner* — Kaveh C Kianni
(74) *Attorney, Agent, or Firm* — Williams Mullen; Thomas F. Bergert

(57) ABSTRACT

An optical fiber connector is provided. The optical fiber connector comprises a plastic housing. The optical fiber connector comprises a metallic clip. The plastic housing is adapted to connect the optical fiber connector to an optical fiber adapter. The metallic clip is arranged at a side of the plastic housing. The metallic clip extends from the plastic housing. The metallic clip is adapted to press against a metallic part of the optical fiber adapter.

13 Claims, 26 Drawing Sheets

(56) References Cited

U.S. PATENT DOCUMENTS

2016/0103284 A1* 4/2016 Nguyen ............... G02B 6/4277
385/78
2017/0176692 A1 6/2017 Gregorski

FOREIGN PATENT DOCUMENTS

| CN | 103869423 | 6/2014 |
|----|-----------|--------|
| CN | 106716203 | 5/2017 |
| JP | 2004126371 | 4/2004 |
| JP | 2015031819 | 2/2015 |

OTHER PUBLICATIONS

China National Intellectual Property Administration, CN Examination Report for Chinese Application No. 201880091024.9, dated Jul. 7, 2021.

* cited by examiner

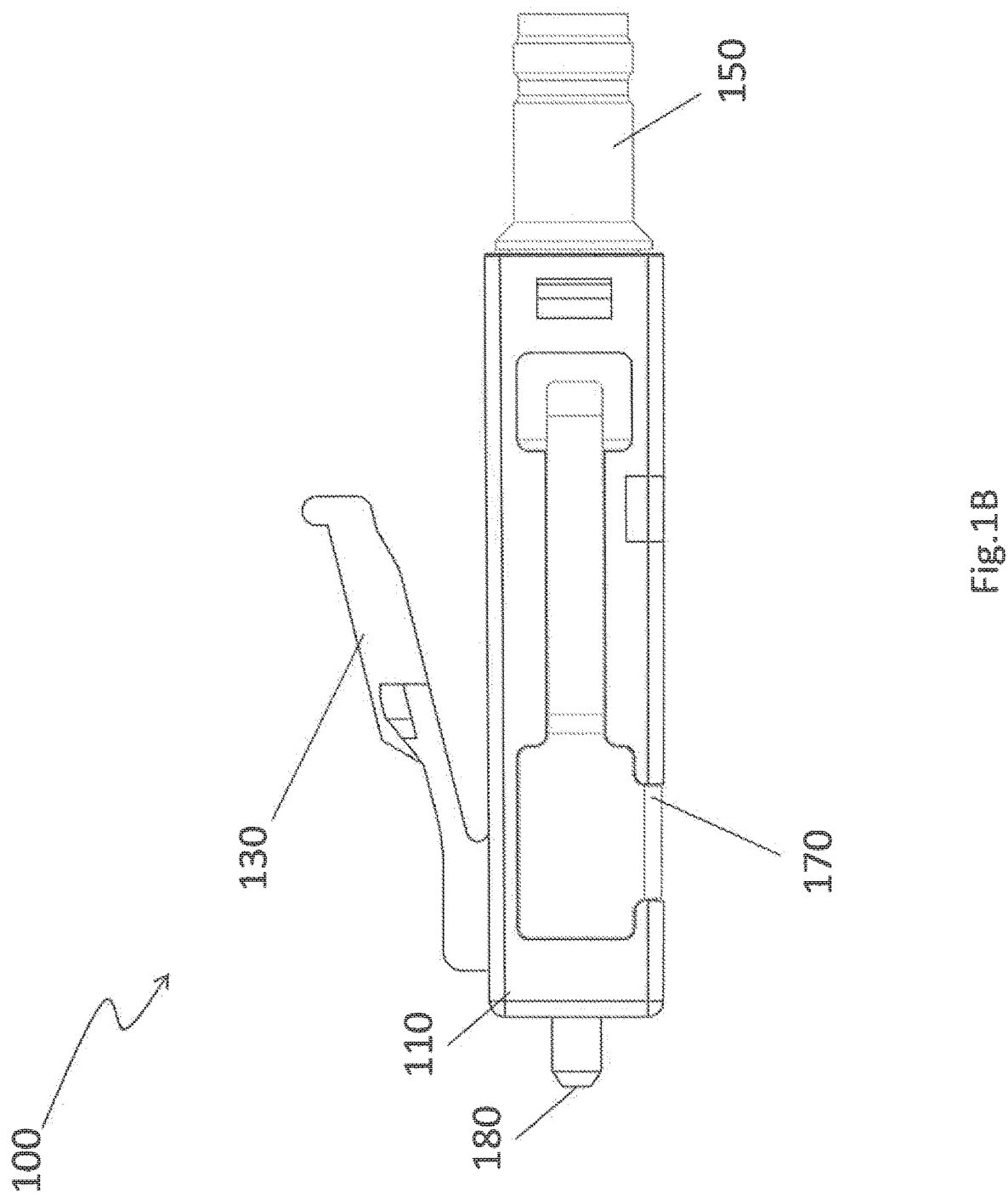

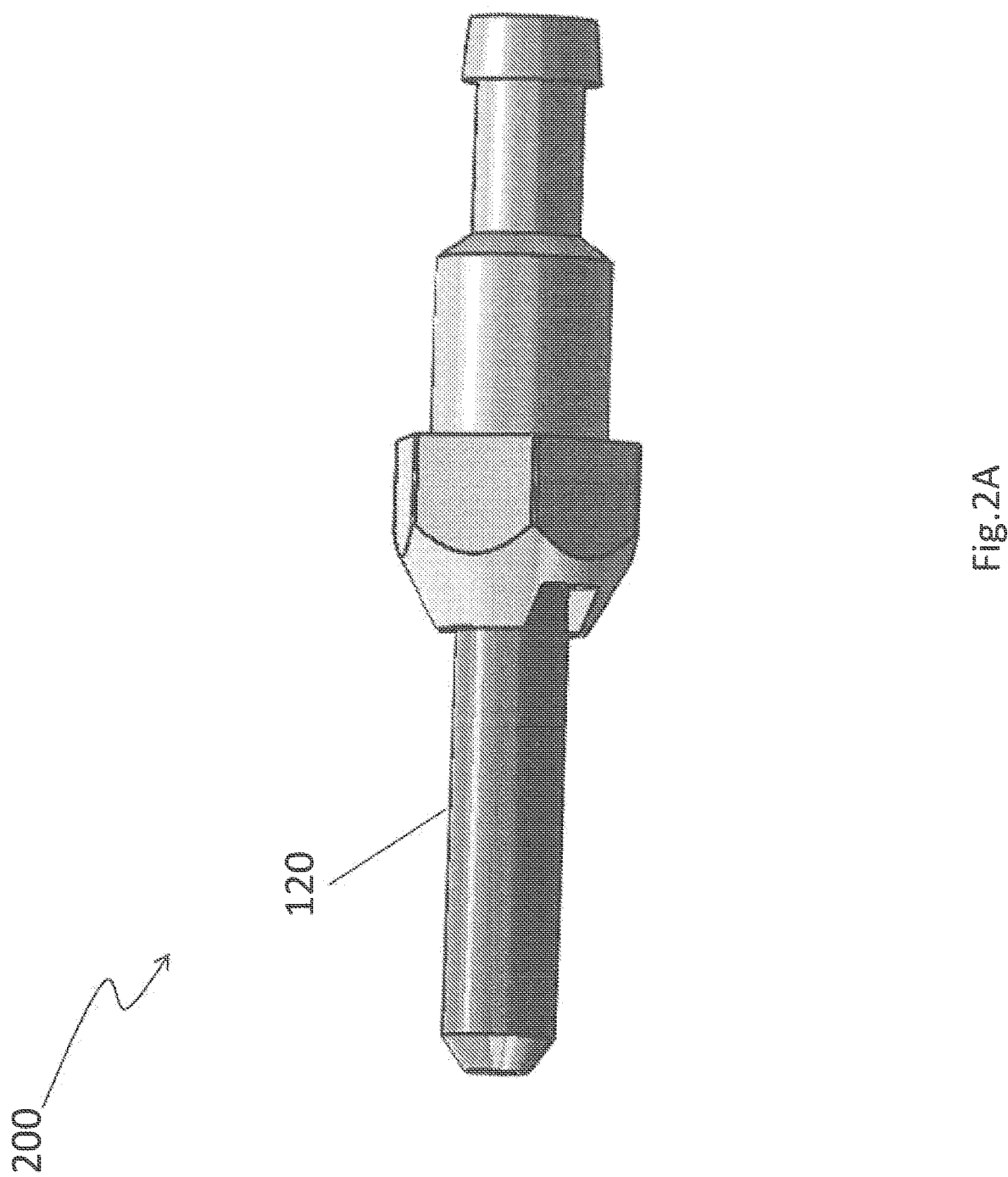

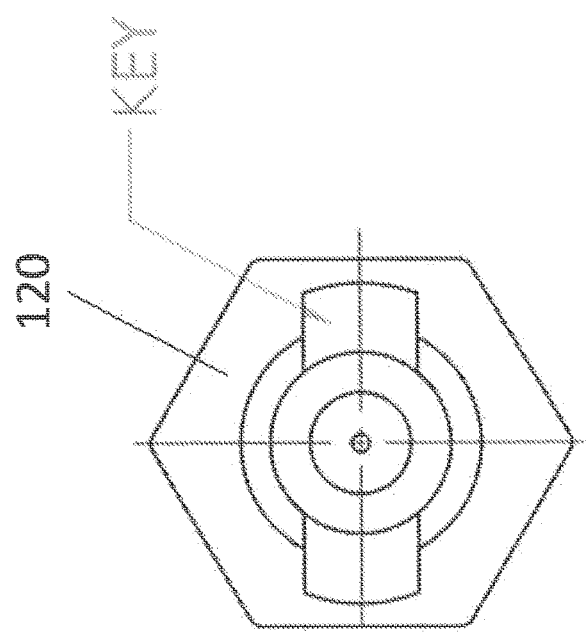
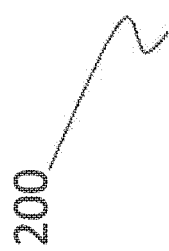
Fig. 2B

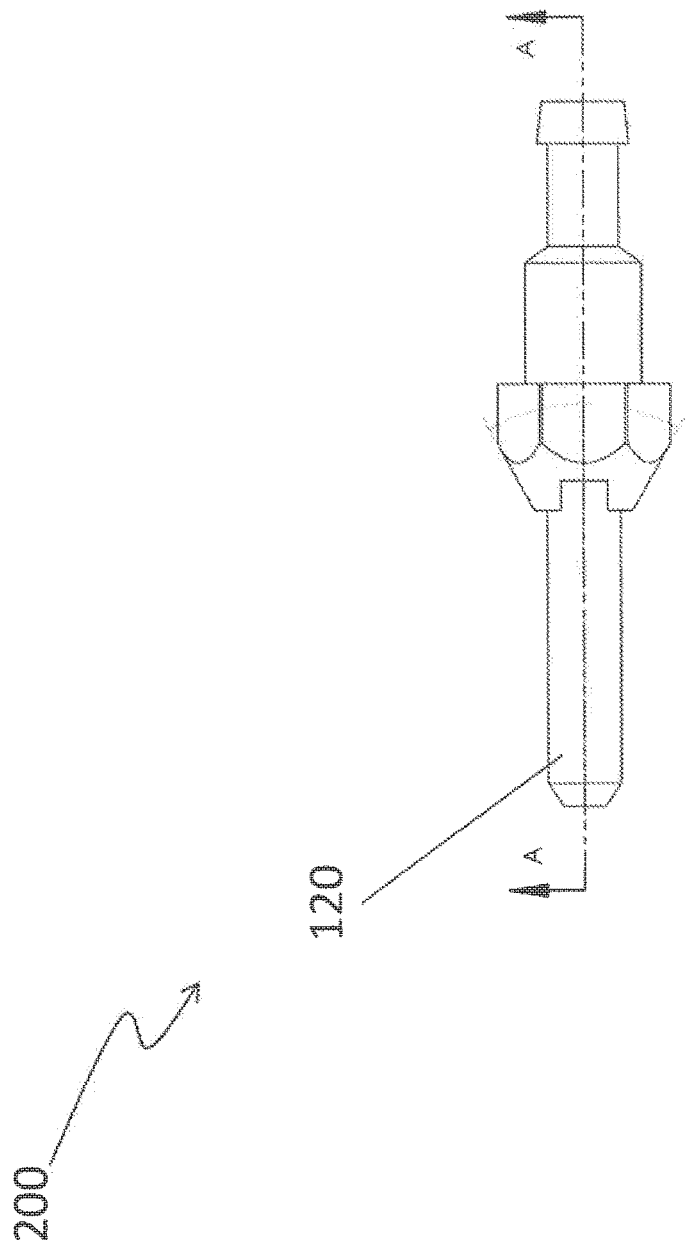

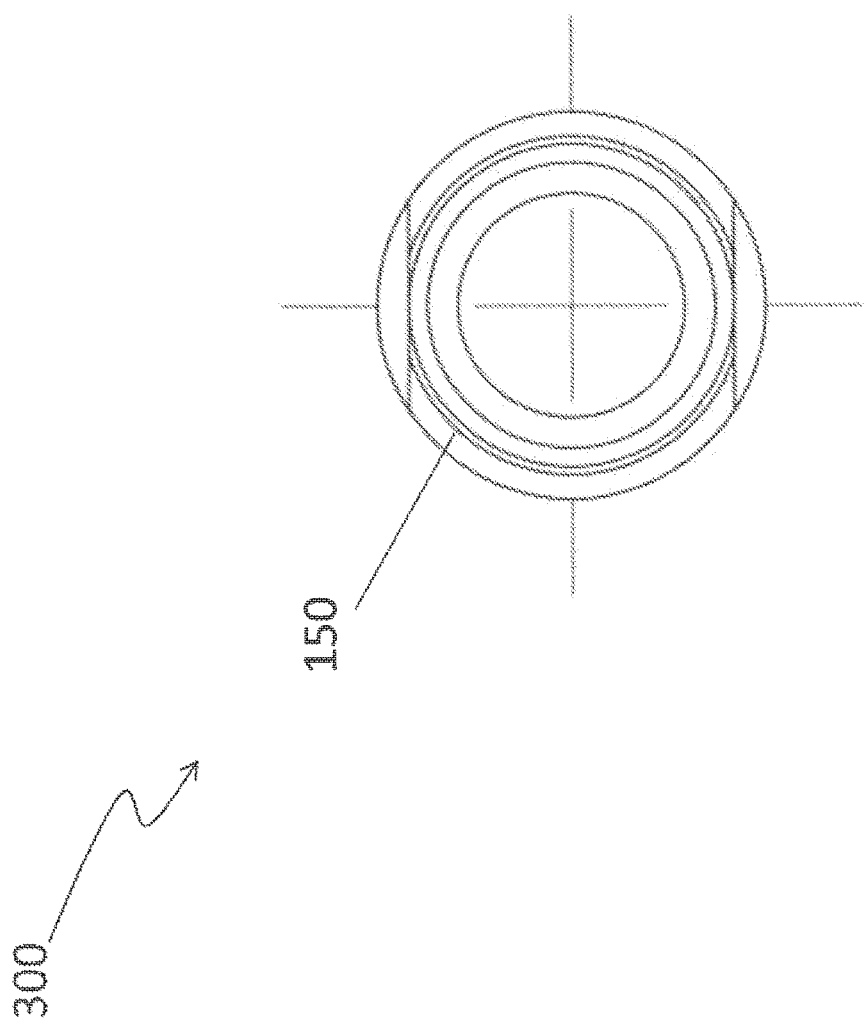

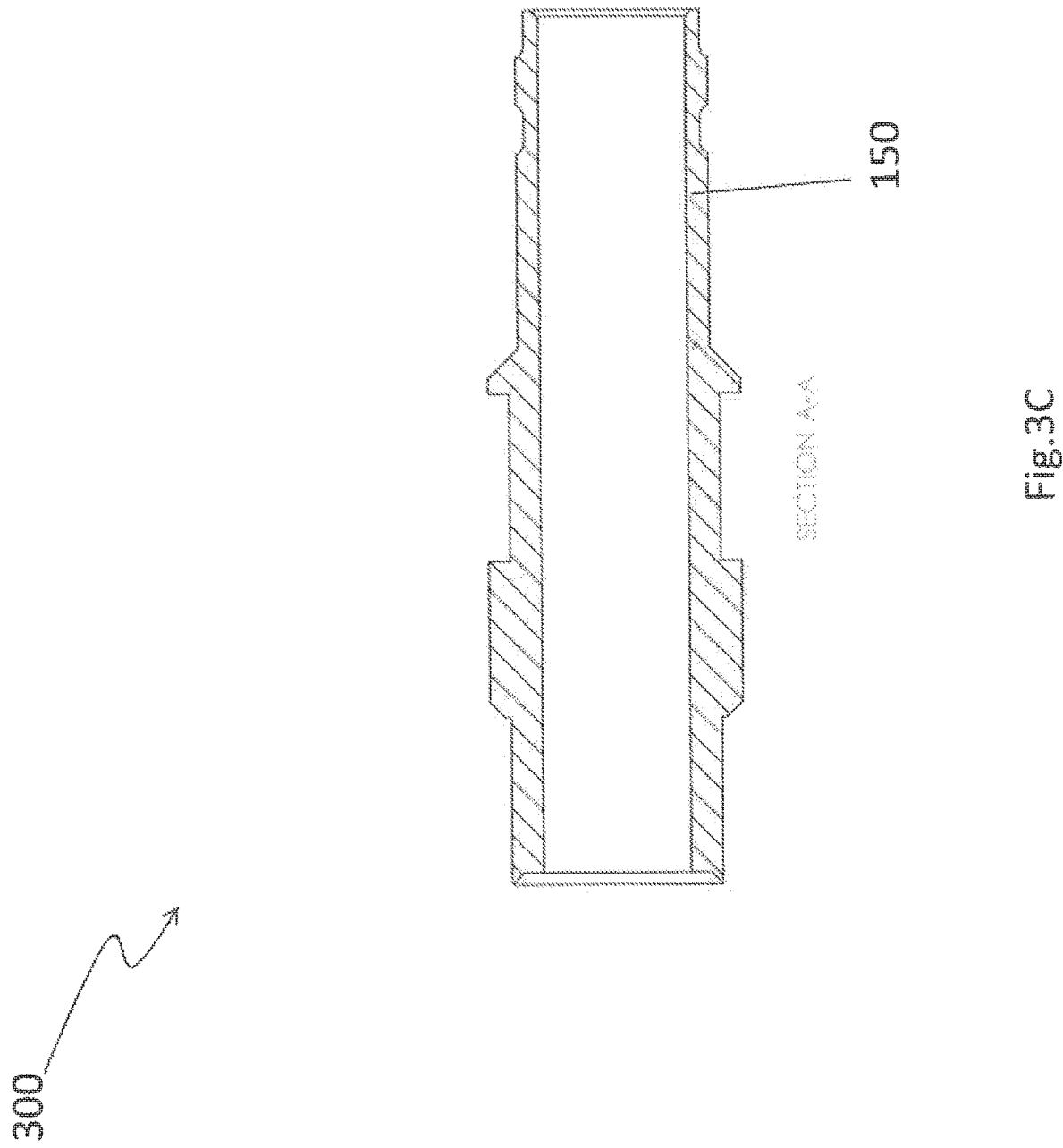

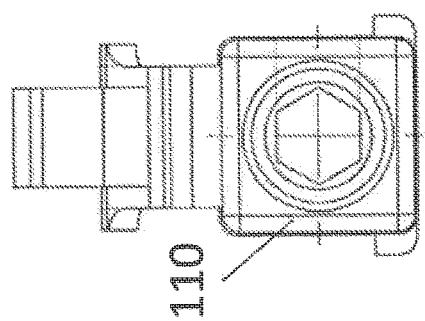
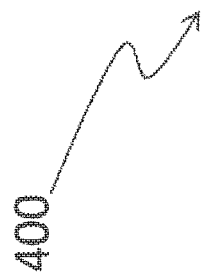
Fig. 4A

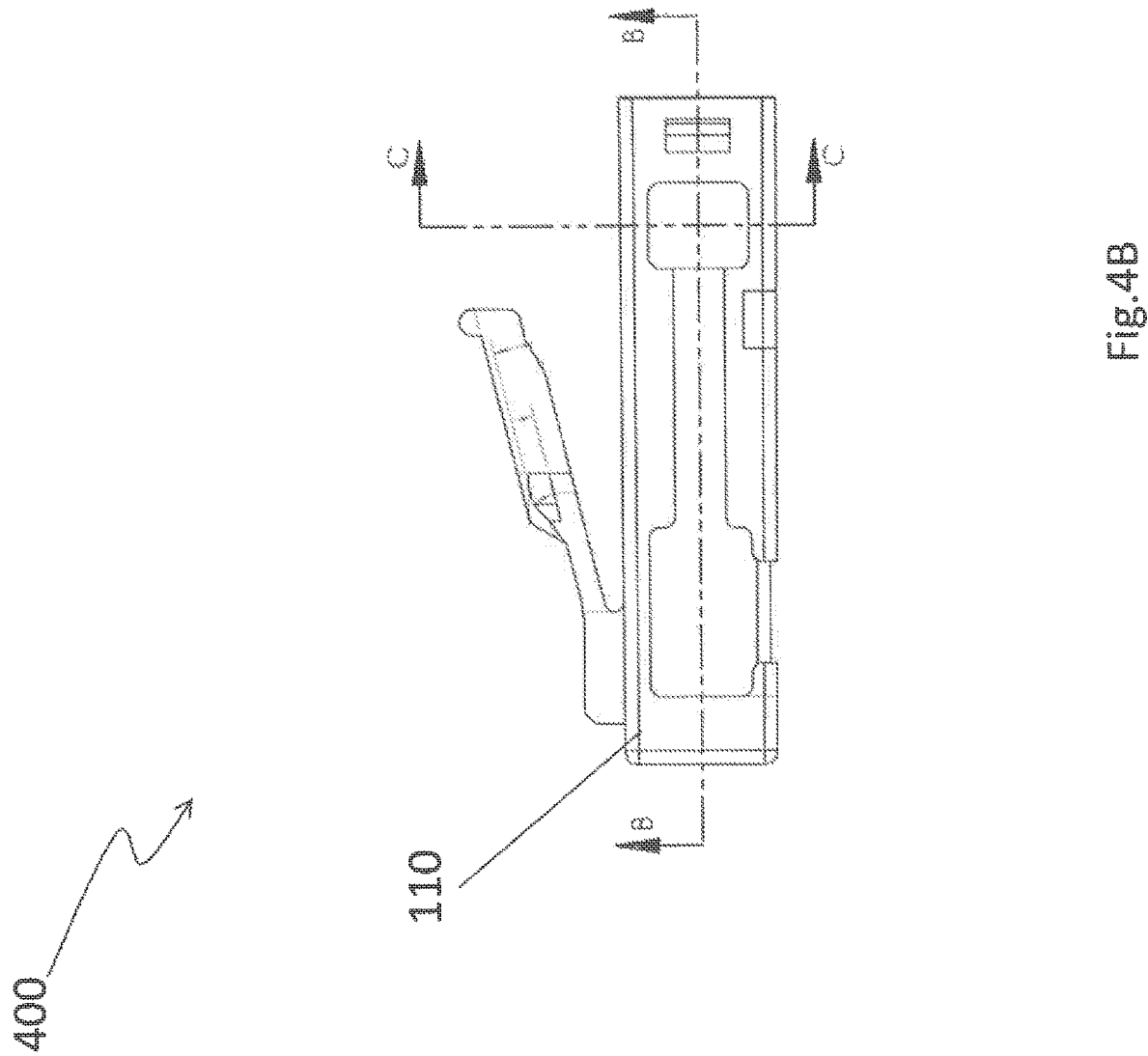

110

400

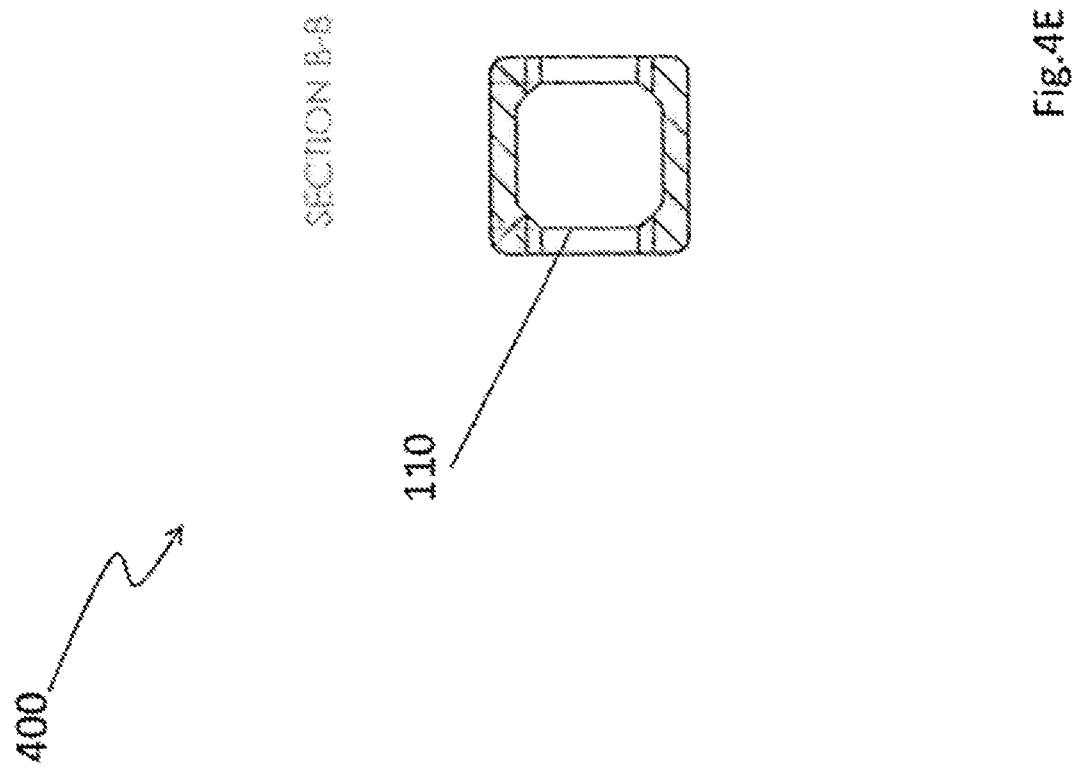

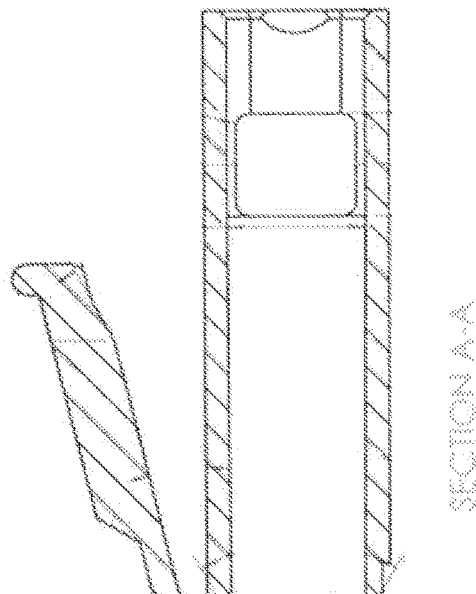
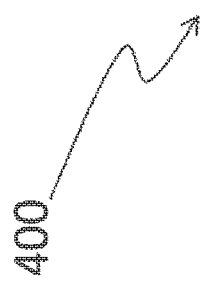
Fig. 4F

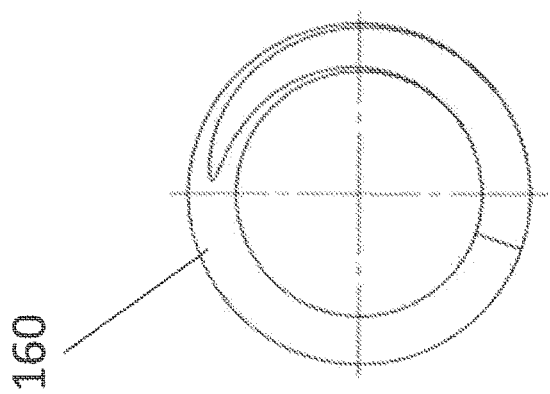
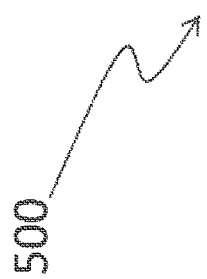
Fig. 5B

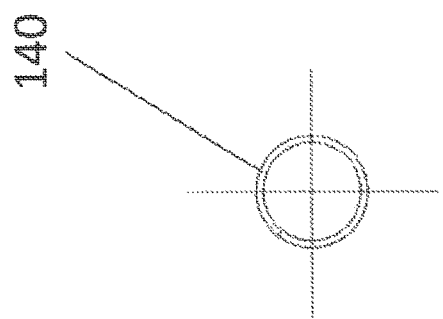

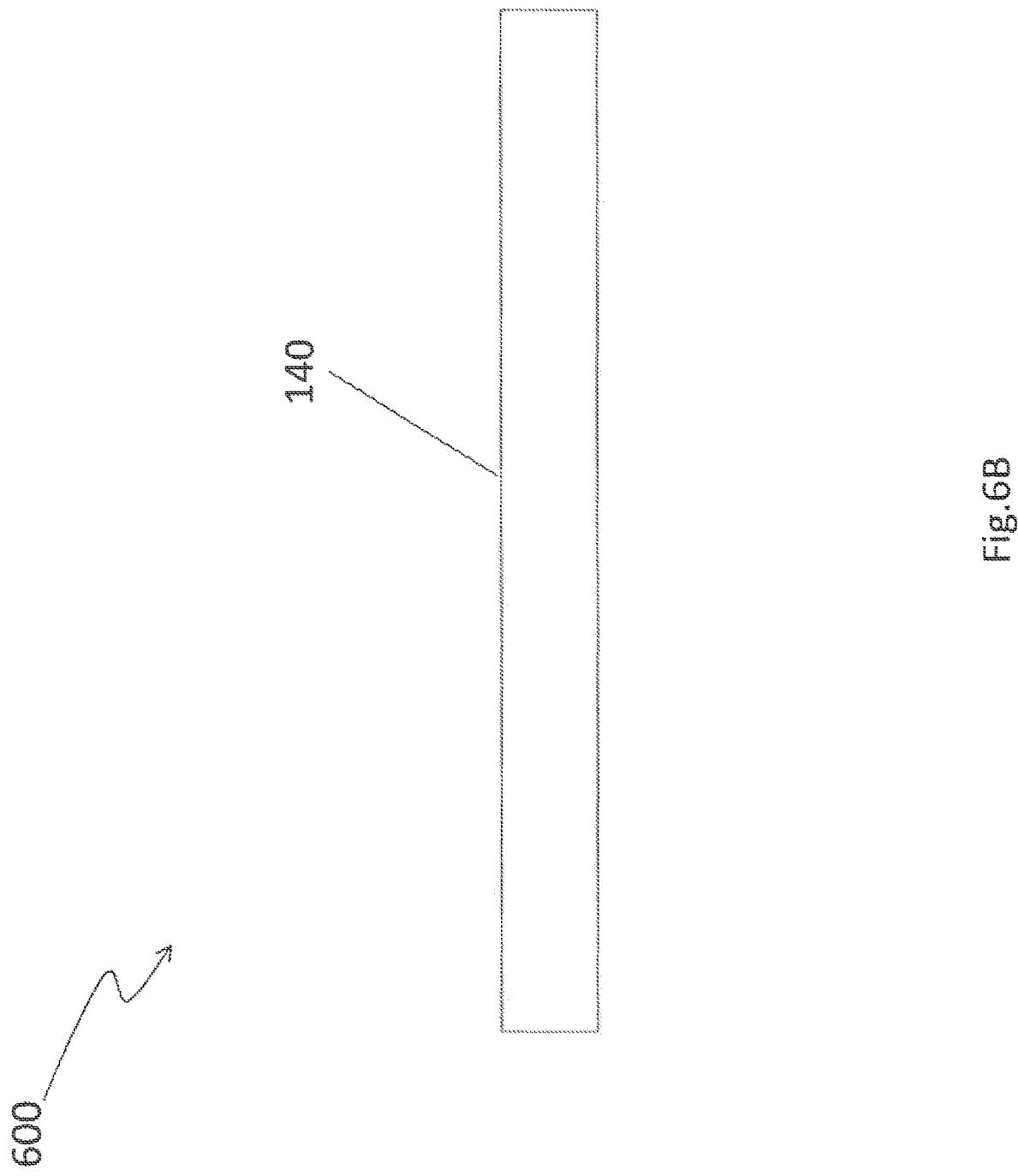

GROUNDABLE FIBER CONNECTOR

CROSS-REFERENCE TO RELATED APPLICATIONS

This application is the U.S. national phase of international application PCT/CN2019/078854, filed on Mar. 13, 2018, which is hereby incorporated herein in its entirety by reference.

Examples relate to concepts for enabling a ground connection for plastic fiber connectors and applications thereof and in particular to an optical fiber connector.

Optical fiber connectors may have to be optimized with respect to their properties and costs. Nevertheless, it is desirable to form optical fiber connectors with a continuous ground connection.

There may be a demand to provide concepts for optical fiber connectors which are groundable.

Such a demand may be satisfied by the subject-matter of the claims.

Figure 7A:
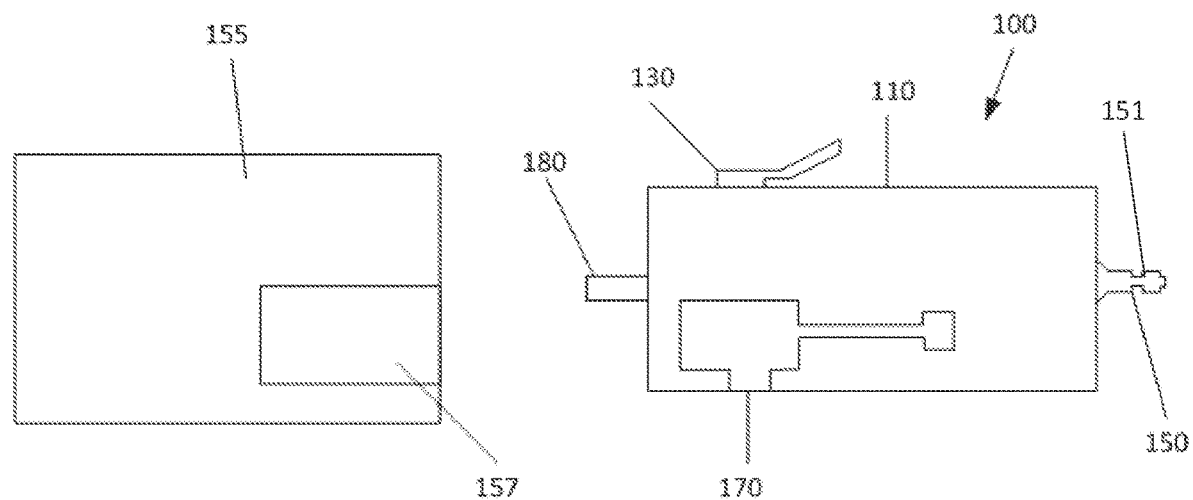
Figure 7B:
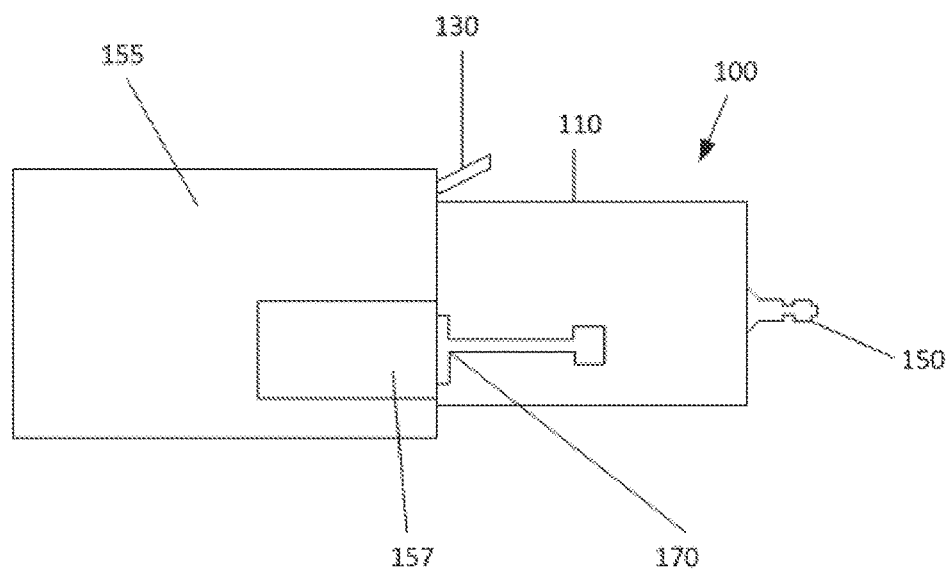

According to an aspect, an optical fiber connector is provided. The optical fiber connector comprises a plastic housing. The optical fiber connector comprises a metallic clip. The plastic housing 110 is adapted to connect the optical fiber connector 100 to an optical fiber adapter 155, as shown in FIG. 7A. The metallic clip is arranged at a side of the plastic housing. The metallic clip extends from the plastic housing. The metallic clip 170 is adapted and arranged to press against a metallic part 157 of the optical fiber adapter 155, as shown in FIG. 7B.

Thus, an uninterrupted ground connection may be established by way of the metallic clip.

In the following, the term "electrical connection" may be referred to or understood as "conductive connection" in the sense that a current may be able to flow through this connection.

The metallic clip may be a first metallic clip. The side may be a first side of the plastic housing. The metallic clip may be adapted to press against the metallic part of the optical fiber adapter in an elastic manner. The metallic clip may be elastic or bendable.

The metallic clip may be adapted to enable an electrical connection (ground connection) with the optical fiber adapter. The electrical connection may be a ground connection. This may be understood as establishing a connection to ground with a potential of 0 Volt. This may also be understood as mass or earth.

The optical fiber adapter may be adapted for (compatible with) the optical fiber connector.

The metallic clip may extend from a first metallic section embedded in the plastic housing at the side of the plastic housing to a second metallic section embedded in the plastic housing at the side of the plastic housing.

Thus, an overall end-to-end continuous ground connection may be ensured.

The metallic clip may be connected between the first metallic section embedded in the plastic housing (at the side of the plastic housing) and the second metallic section embedded in the plastic housing (at the side of the plastic housing).

The embedded first and/or second metallic section may be in the form of a cavity (in plastic material of the plastic housing) filled with metal. The embedded first and/or second metallic section may also be in the form of a groove, slot, furrow, channel, flute or notch.

The first and second metallic sections may be displaced/spaced from each other.

By way of the connector the amount of metallic material to be used can be minimized as much as possible. Such expensive metallic material may be saved.

A first end of the metallic clip may have an electrical connection to the first metallic section at the side of the plastic housing. A second end of the metallic clip may be an open end.

Hereby, metal material may be reduced to a minimum in the connector.

The open end may be the second metallic portion embedded in the plastic housing.

The metallic clip may be connected between the first end of the metallic clip and the second end of the metallic clip in an arc-like manner.

The arc-like manner may enable an undisrupted ground connection, even if the optical fiber connector and the optical fiber adapter are not perfectly matched.

For example, a section of the metallic clip between the first end of the metallic clip and the second end of the metallic clip does not touch the plastic housing. The section of the metallic clip between the first end of the metallic clip and the second end of the metallic clip may be spaced from the plastic housing.

The optical fiber connector may further comprise a metallic ferrule. The metallic ferrule may be adapted to guide an optical fiber of the optical fiber connector. A first end portion of the metallic ferrule may extend over a first end portion of the plastic housing. A second end portion of the metallic ferrule may extend in a space defined by the plastic housing.

The optical fiber connector may further comprise a metallic body. The metallic body may be adapted to be connected to a ground connection via a crimp barrel 151, as shown in FIGS. 1C and 7A. A first end portion of the metallic body may extend in a space defined by a second portion of the plastic housing. A second end of the metallic body may extend over the second end portion of the plastic housing.

The metallic body may also be described as metallic rear body in this description.

The first and second sections of the plastic housing may be in contact. The first and second section of the plastic housing may be spaced apart (from each other).

The optical fiber connector may further comprise a metallic tube. The metallic tube may be adapted to guide an optical fiber of the optical fiber connector. A first end portion of the metallic tube may be around the second end portion of the metallic ferrule. The second end portion of the metallic body may extend over a second end portion of the metallic tube.

The first end portion of the metallic tube may encircle the second end portion of the metallic ferrule.

When a pressure is applied to the metallic ferrule in longitudinal direction (with respect to a direction of an optical fiber of the optical fiber connector), the first end portion of the metallic tube may extend over the second end portion of the metallic ferrule. When no pressure is applied to the metallic ferrule in the longitudinal direction (with respect to the direction of the optical fiber of the optical fiber connector), the first end portion of the metallic tube may encircle the second end portion of the metallic ferrule.

The optical fiber connector may further comprise a metallic spring. The metallic spring may be arranged and adapted to enable an engagement between the metallic ferrule and the metallic body.

A space defined by the plastic housing may incorporate the metallic spring. The space defined by the plastic housing may incorporate at least part of the metallic ferrule. The space defined by the plastic housing may incorporate at least part of the metallic body. The space defined by the plastic housing may incorporate at least part of the metallic tube.

Thus, safety of outer effects may be ensured.

One end of the metallic spring may be in contact with an end of the first end portion of the metallic body. The other end of the metallic spring may be in contact with a part of the metallic ferrule. The part of the metallic ferrule may be between the first and second portions of the metallic ferrule. The metallic spring may be arranged around the first end portion of the metallic tube and the second end portion of the metallic ferrule.

At least part of the first end portion of the metallic body may be attached or form-fit to an (inner) part of the plastic housing.

The metallic spring may be moveably arranged between an end of the first end portion of the metallic body and a part of the metallic ferrule. The part of the metallic ferrule may be between the first and second portions of the metallic ferrule. The metallic spring may be arranged around the first end portion of the metallic tube and the second end portion of the metallic ferrule.

The part of the metallic ferrule may be between the first and second portions of the metallic ferrule in a space defined by the plastic housing. The metallic spring may encircle the first end portion of the metallic tube and the second end portion of the metallic ferrule.

For example, in a first position (relaxed—no tension—no pressure), the spring may not be under tension. This may correspond to the case of when no pressure is applied to the metallic ferrule. For example, in a second position (tension—pressure), the spring may be in contact with the metallic ferrule and the metallic body. This may correspond to the case of when pressure is applied to the metallic ferrule.

The metallic spring may overlap a first end portion of the ferrule and a first end portion of the metallic tube in a first position of the metallic spring (no tension).

The metallic spring may overlap a first end portion of the metallic ferrule and more than the second end portion of the metallic tube in a second position of the metallic spring (tension).

The optical fiber connector may further comprise a plastic fastener. The plastic fastener may be arranged on a top part of the plastic housing. The plastic fastener may be adapted to arrest the optical fiber connector in or at the optical fiber adapter. The optical fiber adapter may be complementary to the plastic housing of the optical fiber connector.

Thus, arrest of the optical fiber connector in the optical fiber adapter may be ensured.

The optical fiber connector may further comprise an optical fiber. The optical fiber may be adapted to transfer optical signals. Any one of the may be arranged around the optical fiber. The metallic tube, the metallic ferrule, the metallic body, the metallic spring and the plastic housing may fall under the ambit of the term "elements" or may be understood as such. Any one of the elements may be arranged to encircle the optical fiber.

The optical fiber connector may further comprise another metallic clip. The other metallic clip may be arranged at another side of the plastic housing. The other metallic clip may extend from the plastic housing. The other metallic clip may be adapted to press against another metallic part of the optical fiber adapter.

The other metallic clip may be adapted to enable an electrical connection with the optical fiber adapter. Thus, the other metallic clip may provide a further ground connection in addition to the (first) metallic clip.

The other metallic clip may be a second metallic clip. The other side of the plastic housing may be a second side of the plastic housing.

The plastic housing may have a top part, a bottom part and two side parts. The two side parts may be the first and second sides of the plastic housing. The second side of the plastic housing may be opposite to the first side of the plastic housing. The top part of the plastic housing may connect the first and second sides of the plastic housing. The bottom part of the plastic housing may also connect the first and second sides of the plastic housing.

The plastic fastener may extend from the top part of the plastic housing.

The other metallic clip may be adapted to press against the other metallic part of the optical fiber adapter in an elastically way. The other metallic clip may be elastic or bendable.

The other metallic clip may be adapted to enable the electrical connection (ground connection) with the optical fiber adapter. The electrical connection may be the ground connection. This may be understood as establishing the connection to ground with a potential of 0 Volt. This may also be understood as mass.

The other metallic clip may extend from a third metallic section embedded in the plastic housing at the other side of the plastic housing to a fourth metallic section embedded in the plastic housing at the other side of the plastic housing.

Thus, an overall end-to-end continuous ground connection may be ensured by the use of a second metallic clip.

The other metallic clip may be connected between the third metallic section embedded in the plastic housing (at the other side of the plastic housing) and the fourth metallic section embedded in the plastic housing (at the side of the plastic housing).

The embedded third and/or fourth metallic section may be in the form of a cavity (within the plastic material of the plastic housing) filled with metal. The embedded third and/or fourth metallic section may also be in the form of a groove, slot, furrow, channel, flute or notch.

The third and fourth metallic sections may be displaced from each other.

A first end of the other metallic clip may have an electrical connection to the third metallic section at the other side of the plastic housing. A second end of the other metallic clip may be an open end.

The open end may be the fourth metallic portion embedded in the plastic housing.

The other metallic clip may be connected between the first end of the other metallic clip and the second end of the other metallic clip in an arc-like manner.

The arc-like manner may enable an undisrupted ground connection, even if the optical fiber connector and the optical fiber adapter are not perfectly matched. Further, the second metallic clip may ensure conformity and less wear and tear with respect to only the first metallic clip.

For example, a section of the other metallic clip between the first end of the other metallic clip and the second end of the other metallic clip does not touch the plastic housing. The section of the other metallic clip between the first end of the other metallic clip and the second end of the other metallic clip may be spaced from the plastic housing.

The metallic spring may be arranged and adapted to enable an electrical connection between the metallic body and the metallic ferrule. The metallic tube may be arranged and adapted to enable an electrical connection to the metallic ferrule. The first metallic section embedded in the plastic housing at the side of the plastic housing may be electrically/ conductively connected to the metallic rear body. The third metallic section embedded in the plastic housing at the other side of the plastic housing may be electrically/conductively connected to the metallic body. The electrical/conductive connection may be established by direct connection of the first/third section to the metallic body.

The optical fiber connector may be a lucent connector, LC. The optical fiber connector may be a subscriber connector, SC. The optical fiber connector may be a multi-fiber push on, MPO, connector (also called multipath push-on).

It is also to be understood that the terms used herein are for purpose of describing individual embodiments and are not intended to be limiting. Unless otherwise defined, all technical and scientific terms used herein have the meaning which corresponds to the general understanding of the skilled person in the relevant technical field of the present disclosure; they are to be understood too neither too far nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed based on the definition in the lexicon or the context. A too narrow interpretation should be avoided.

It is to be understood that terms such as e.g. "comprising" "including" or "having" etc. mean the presence of the described features, numbers, operations, acts, components, parts, or combinations thereof, and do not exclude the presence or possible addition of one or more further features, numbers, operations, acts, components, parts or their combinations.

Although terms like "first" or "second" etc. may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to", "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

In the following, the preferred embodiments of the present disclosure will be described with reference to the accompanying drawings; the same components are always provided with the same reference symbols.

In the description of the present disclosure, detailed explanations of known connected functions or constructions are omitted, insofar as they are unnecessarily distracting from the present disclosure; such functions and constructions are, however, understandable to the skilled person in the technical field of the present disclosure. The accompanying drawings are illustrative of the present disclosure and are not to be construed as a limitation. The technical idea of the present disclosure is to be construed as comprising, in addition to the accompanying drawings, all such modifications, variations and variants.

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments. All dimensions shown in the figures below may be non-delimiting for the present disclosure and just clarify the extent of the present invention.

Figure 1A:
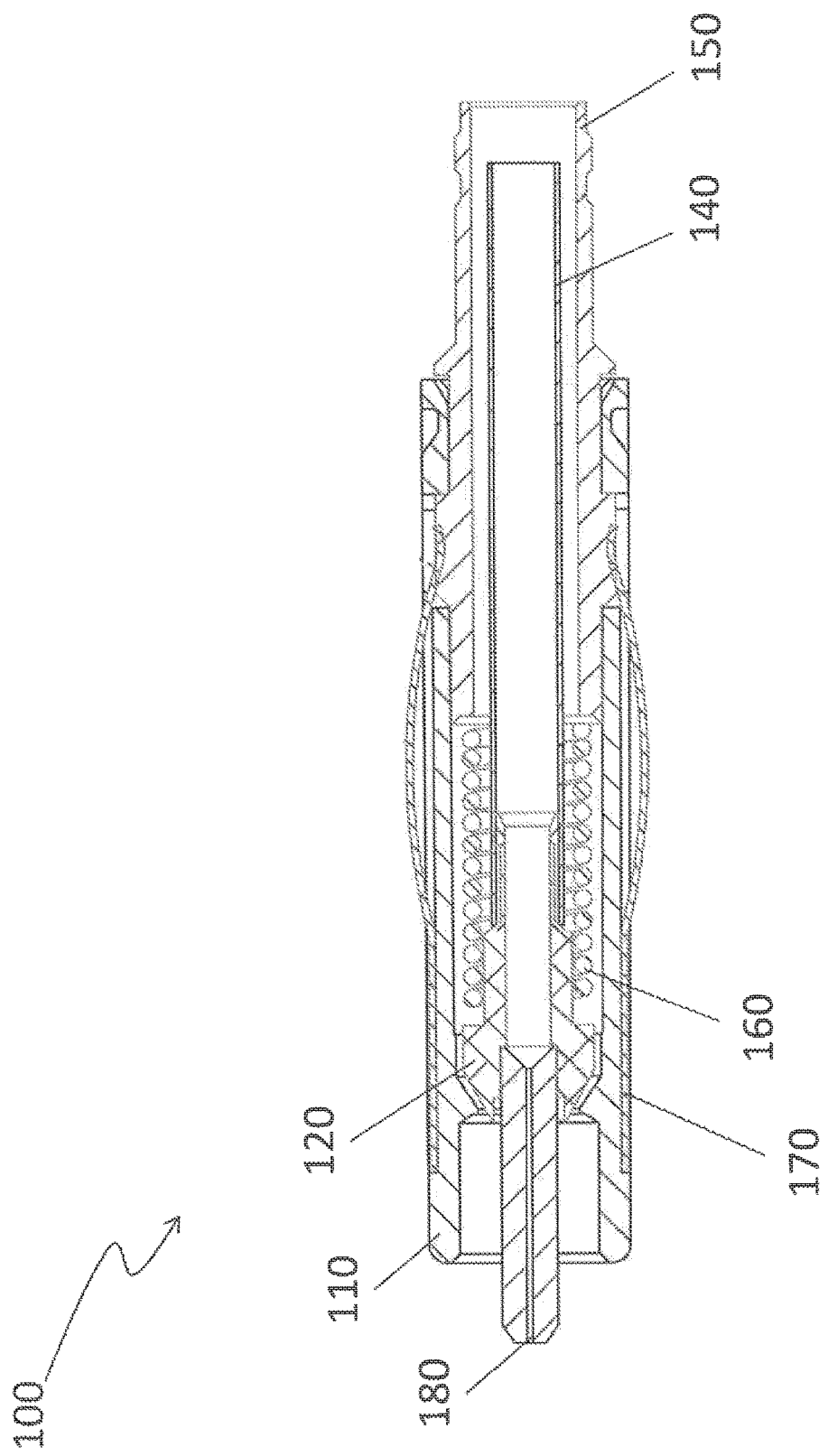
Figure 1C:
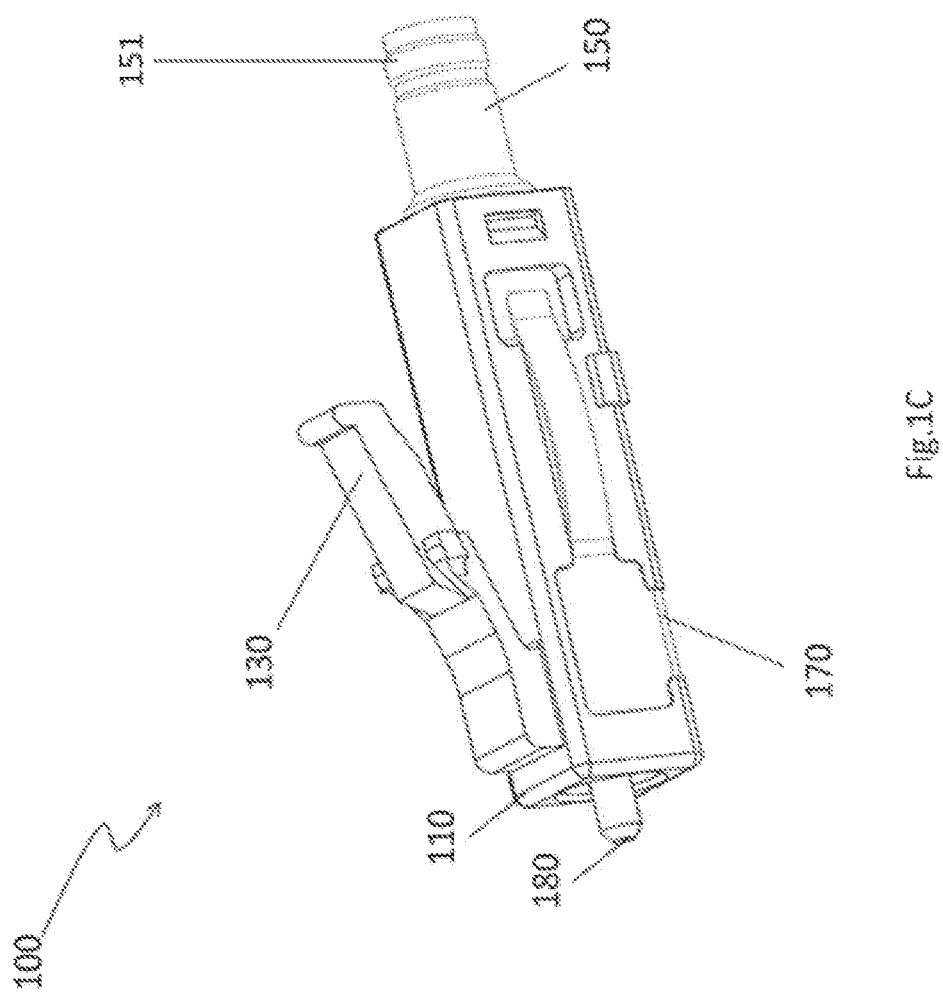

FIG. 1A schematically illustrates an optical fiber connector in a first view

Figure 1D:
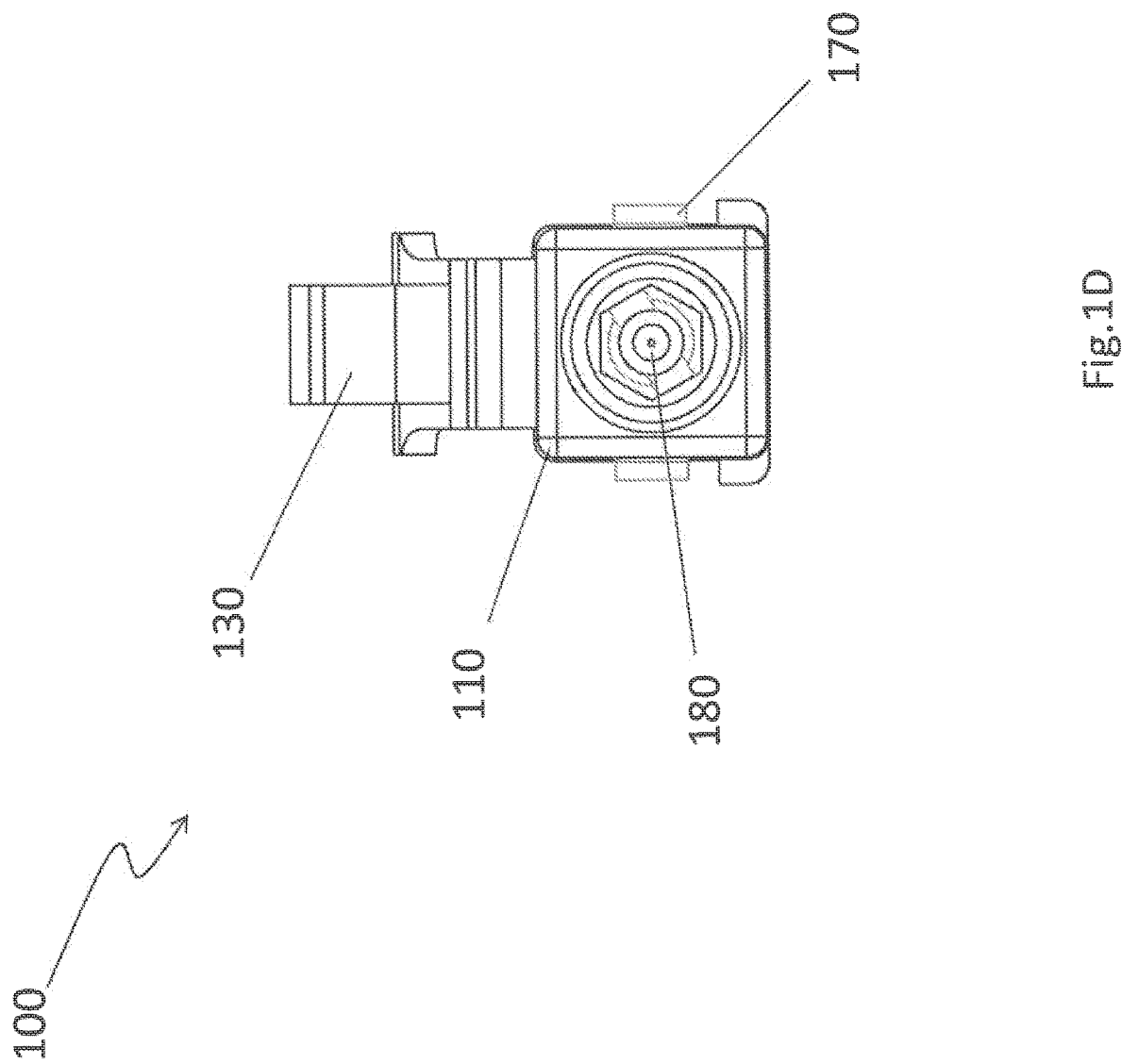
Figure 2C:
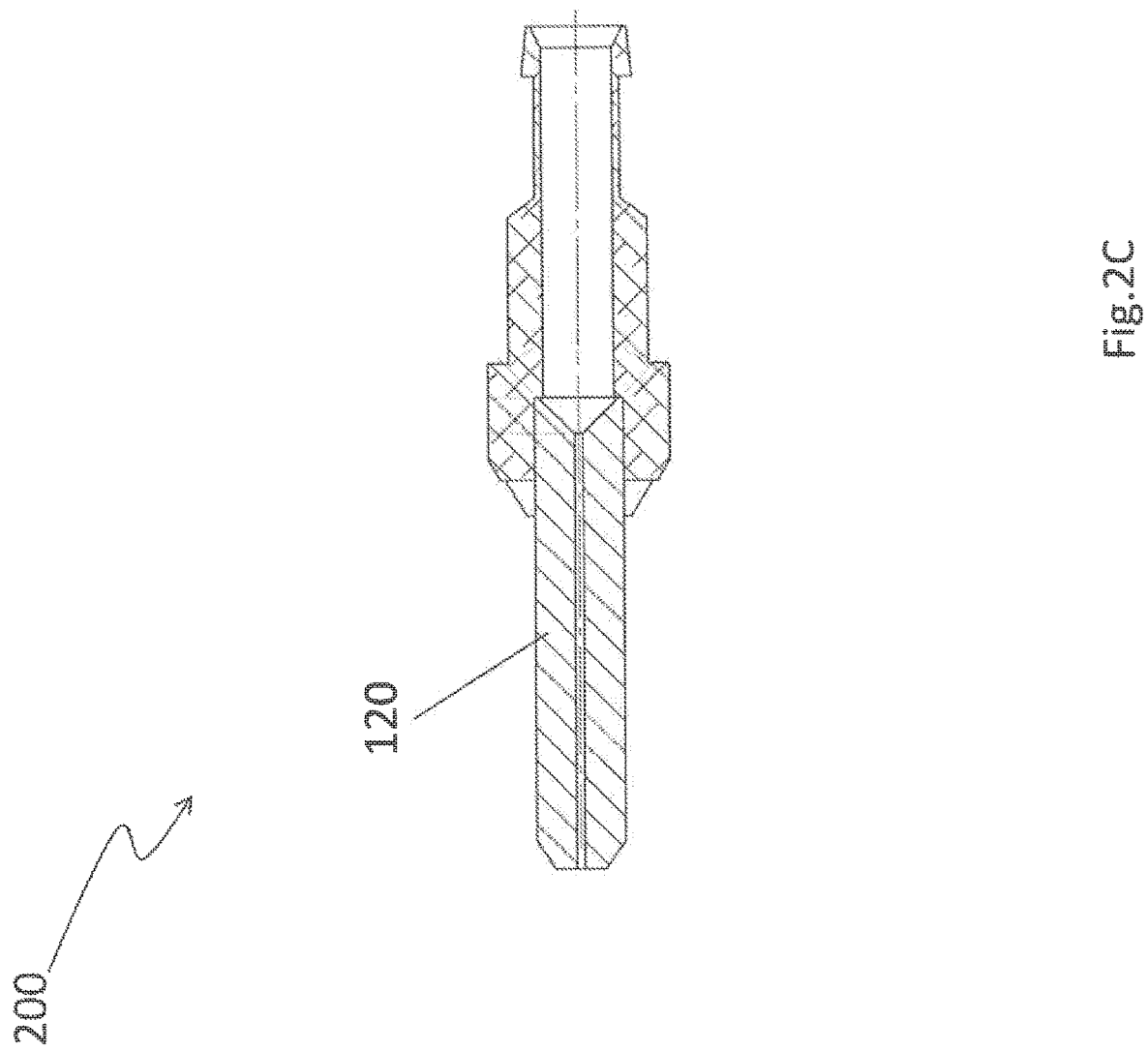
Figure 3A:
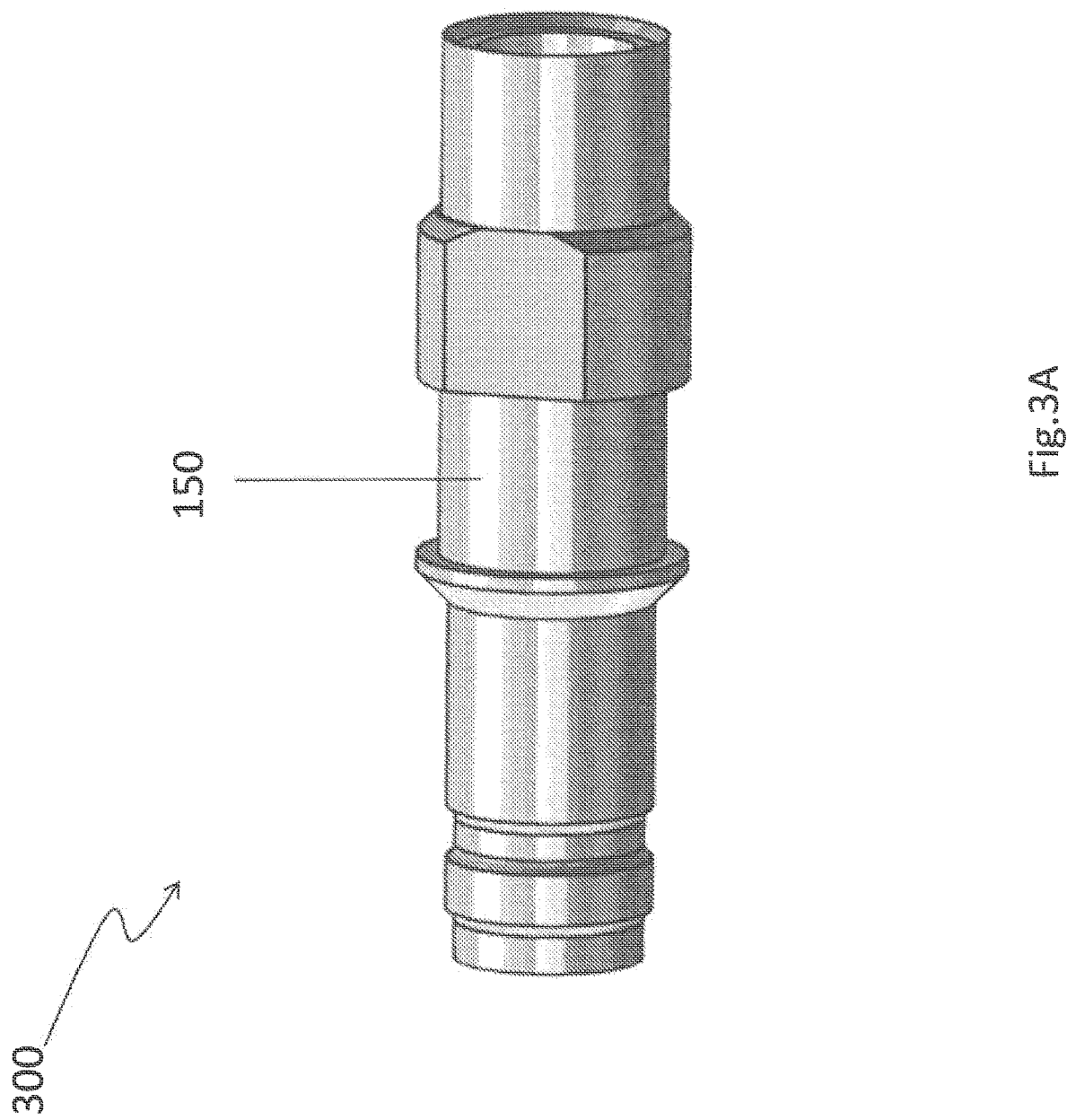
Figure 3D:
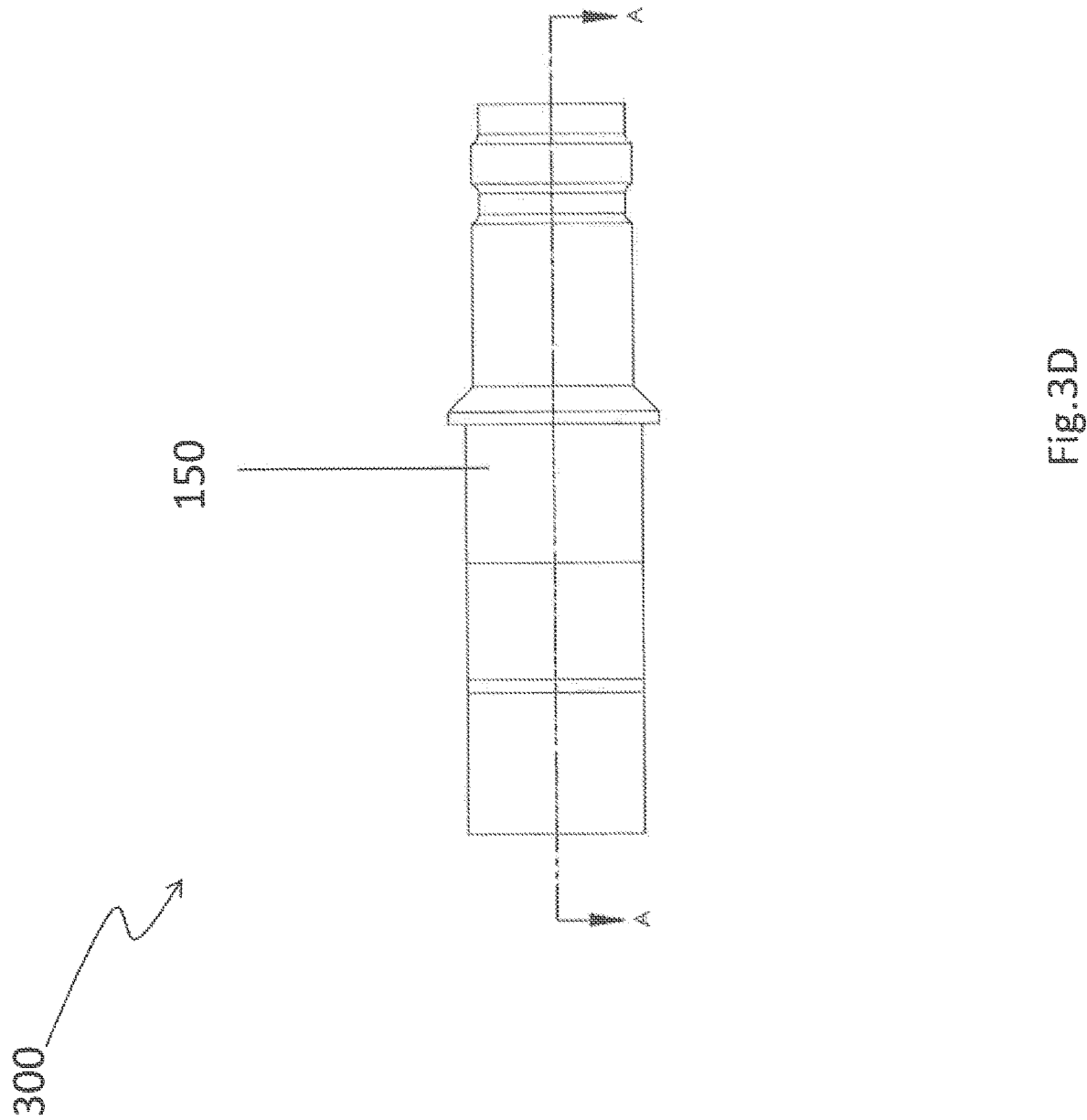
Figure 3E:
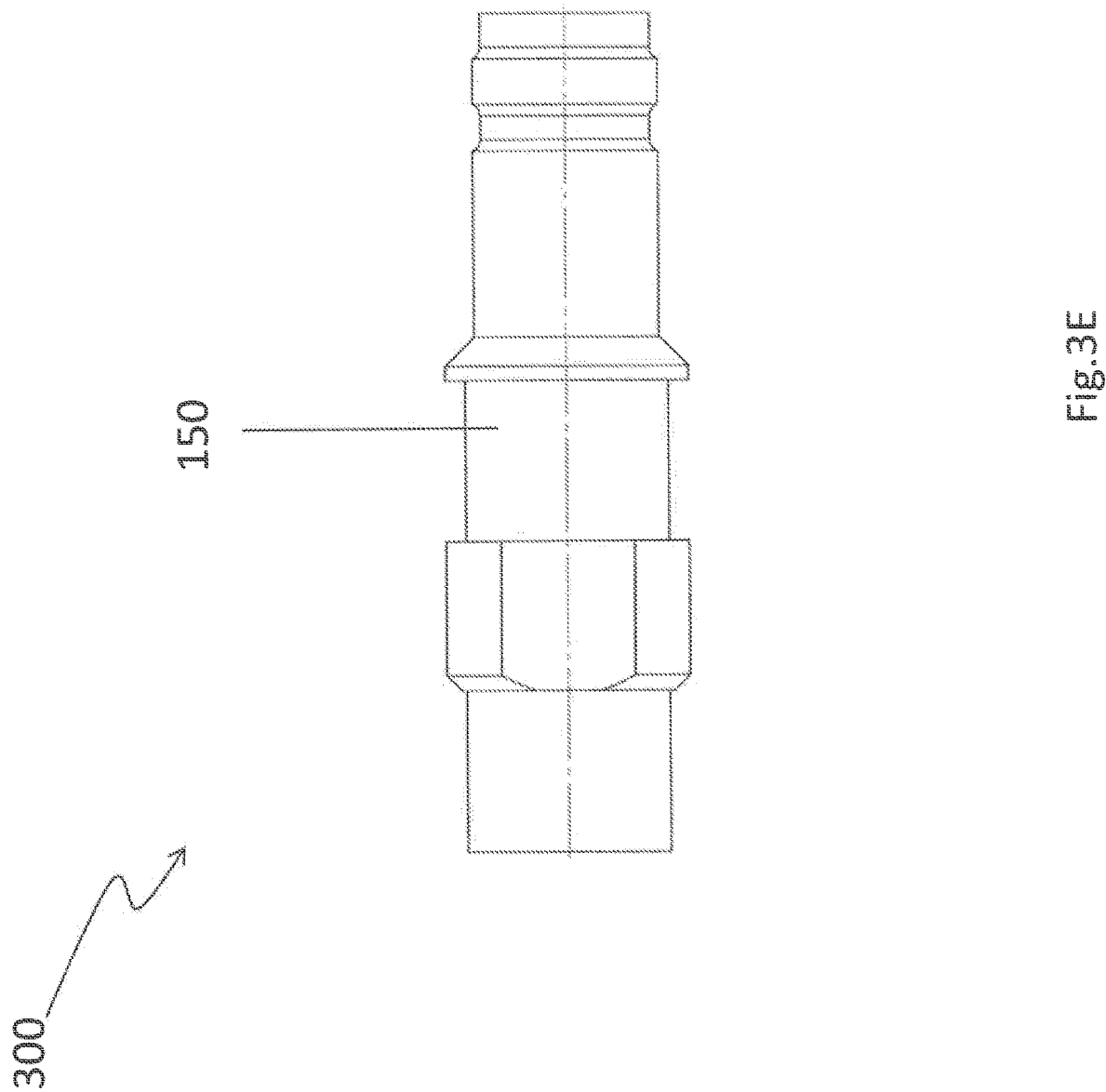
Figure 4C:
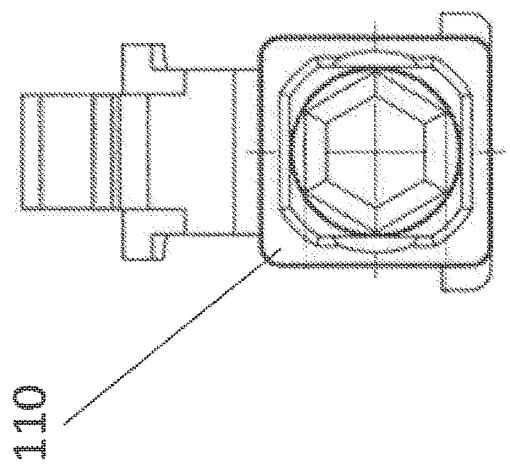
Figure 4D:
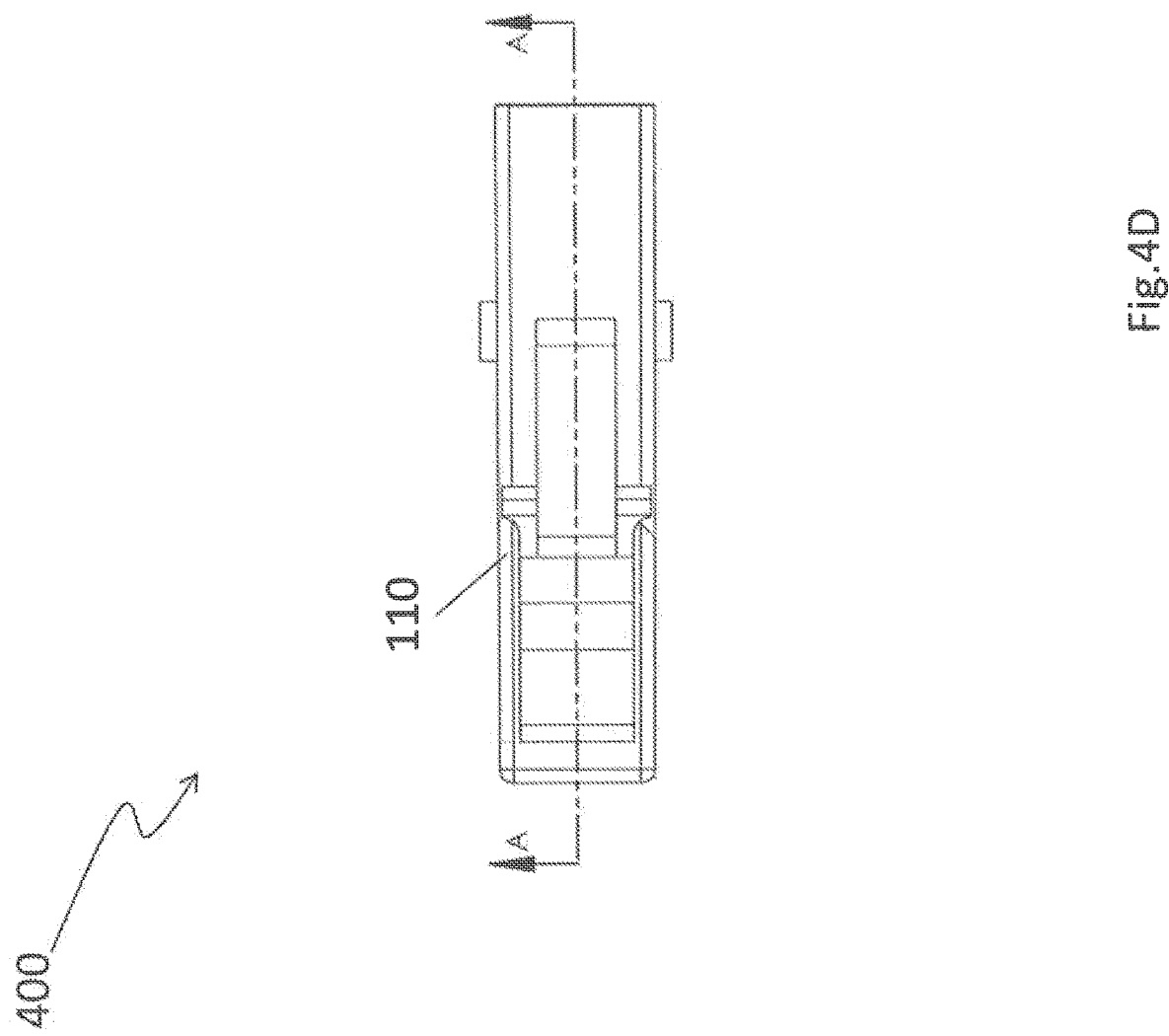
Figure 4G:
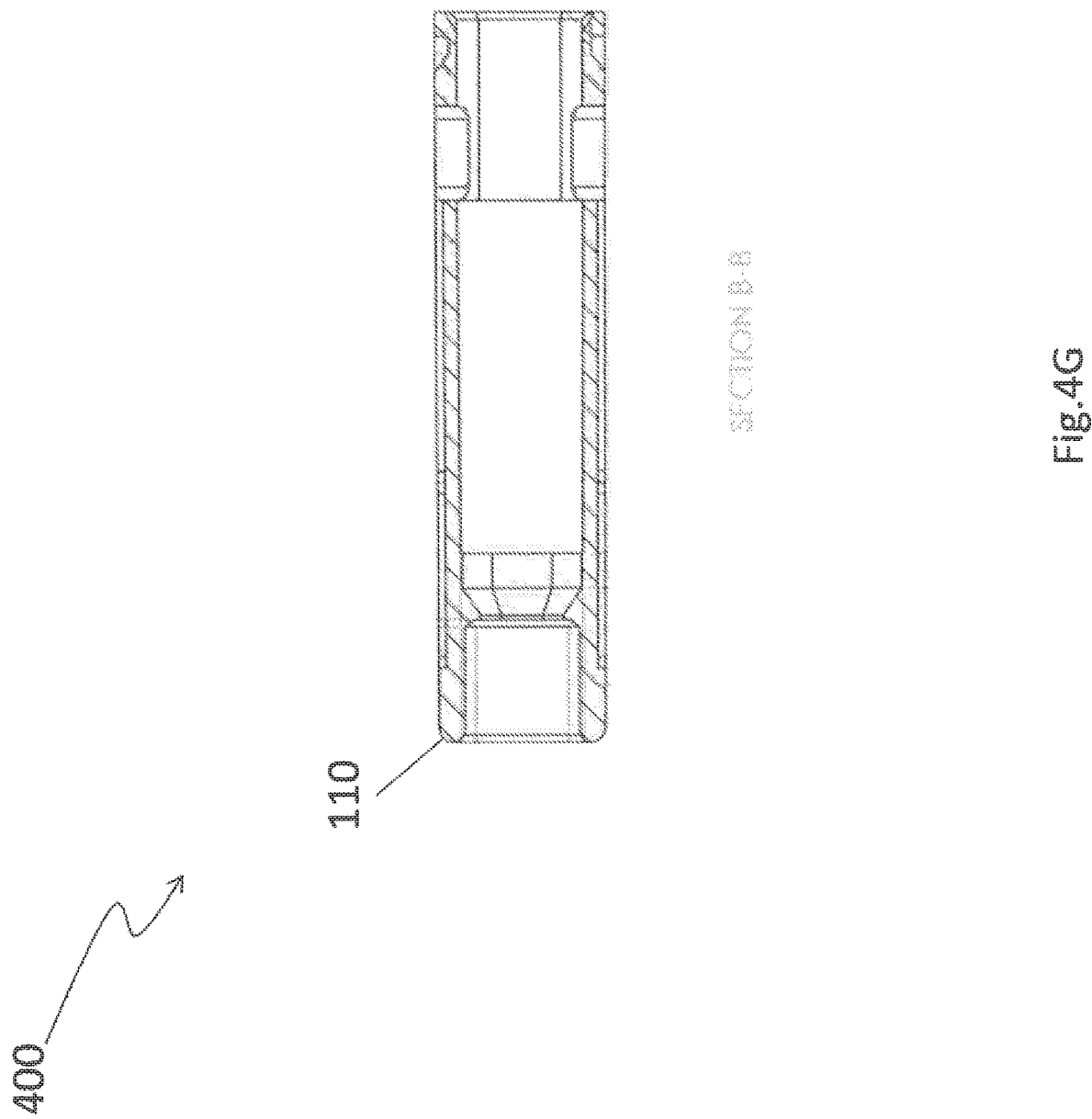
Figure 5A:
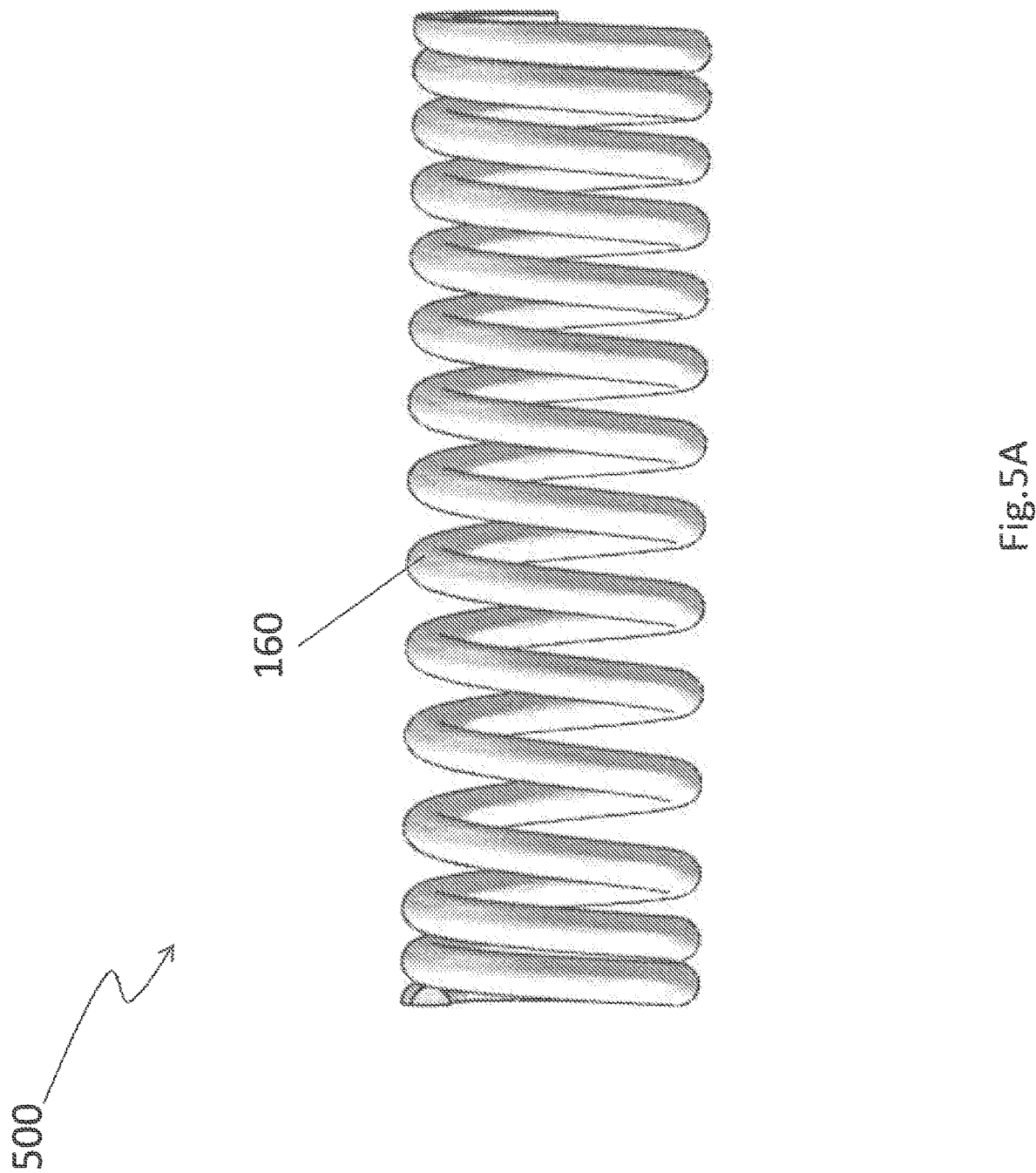
Figure 5C:
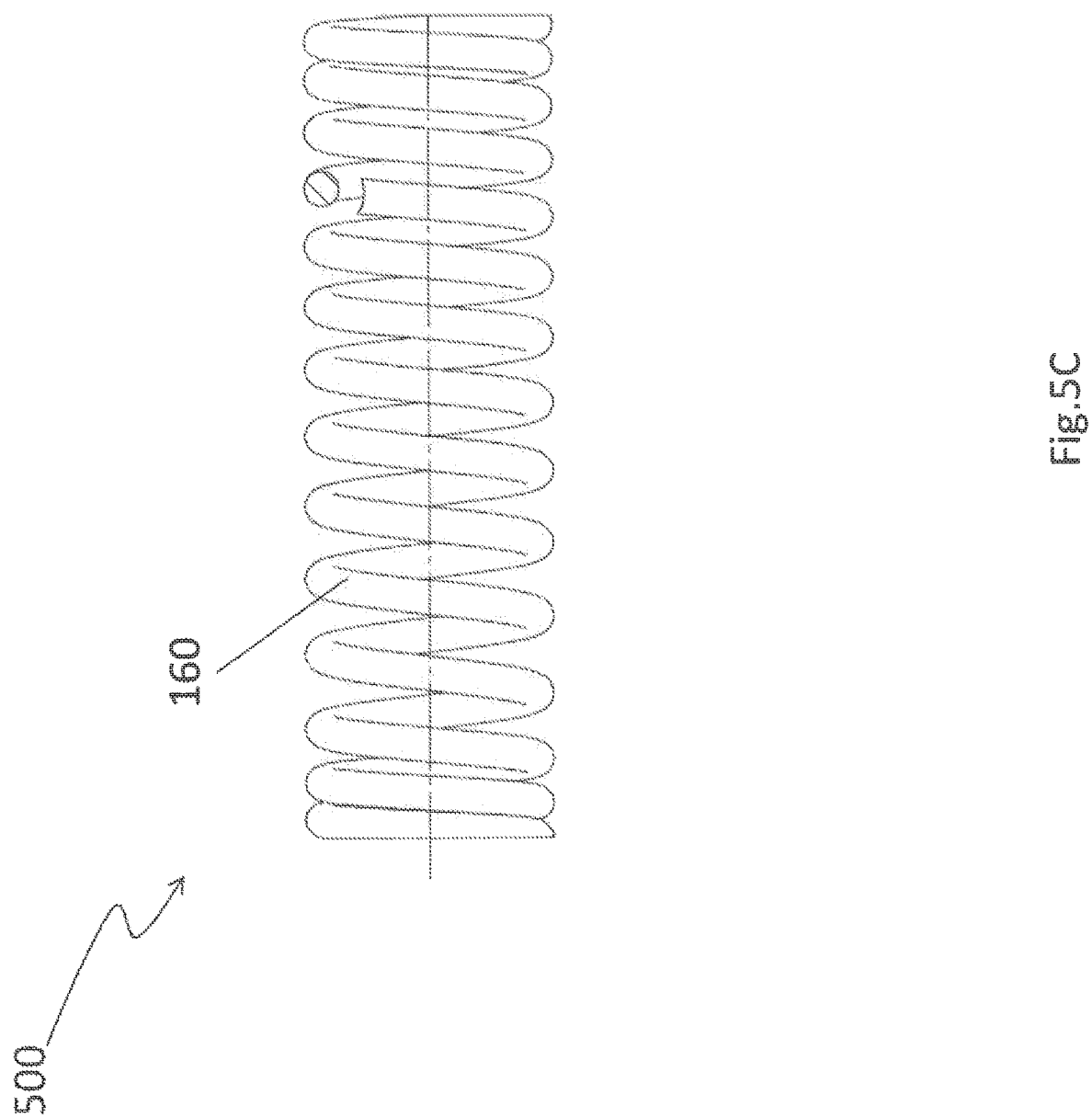

FIG. 1B schematically illustrates an optical fiber connector in a second view;

FIG. 1C schematically illustrates an optical fiber connector in a third view;

FIG. 1D schematically illustrates an optical fiber connector in a fourth view;

FIG. 2A schematically illustrates a metallic ferrule of an optical fiber connector in a first view;

FIG. 2B schematically illustrates a metallic ferrule of an optical fiber connector in a second view;

FIG. 2C schematically illustrates a metallic ferrule of an optical fiber connector in a third view;

FIG. 2D schematically illustrates a metallic ferrule of an optical fiber connector in a fourth view;

FIG. 3A schematically illustrates a metallic body of an optical fiber connector in a first view;

FIG. 3B schematically illustrates a metallic body of an optical fiber connector in a second view;

FIG. 3C schematically illustrates a metallic body of an optical fiber connector in a third view;

FIG. 3D schematically illustrates a metallic body of an optical fiber connector in a fourth view;

FIG. 3E schematically illustrates a metallic body of an optical fiber connector in a fifth view;

FIG. 4A schematically illustrates a plastic housing of an optical fiber connector in a first view;

FIG. 4B schematically illustrates a plastic housing of an optical fiber connector in a second view;

FIG. 4C schematically illustrates a plastic housing of an optical fiber connector in a third view;

FIG. 4D schematically illustrates a plastic housing of an optical fiber connector in a fourth view;

FIG. 4E schematically illustrates a plastic housing of an optical fiber connector in a fifth view;

FIG. 4F schematically illustrates a plastic housing of an optical fiber connector in a sixth view;

FIG. 4G schematically illustrates a plastic housing of an optical fiber connector in a seventh view;

FIG. 5A schematically illustrates a metallic spring of an optical fiber connector in a first view;

FIG. 5B schematically illustrates a metallic spring of an optical fiber connector in a second view;

FIG. 5C schematically illustrates a metallic spring of an optical fiber connector in a third view;

FIG. 6A schematically illustrates a metallic tube of an optical fiber connector in a first view; and FIG. 6B schematically illustrates a metallic tube of an optical fiber connector in a second view.

FIGS. 7A and 7B show an optical fiber adapter and optical fiber connector in an uncoupled and a coupled state, respectively, in accordance with embodiments of the present disclosure.

The variants of the functional and operational aspects as well as their functional and operational aspects described herein are only for a better understanding of its structure, its functions and properties; they do not limit the disclosure to the embodiments. The figures are partially schematic, said essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The optical fiber connector will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

FIG. 1A schematically illustrates an optical fiber connector 100 in a first view. The first view is a top view illustrating all the elements of the optical fiber connector 100, which may be used to establish a groundable plastic fiber connector.

The optical fiber connector 100 comprises a plastic housing 110 and a metallic clip 170. Further, the optical fiber connector 100 may comprise a metallic ferrule 120. Further, the optical fiber connector 100 may comprise a plastic fastener 130 (see FIGS. 2B to 2D). Further, the optical fiber connector 100 may comprise a metallic tube 140. Further, the optical fiber connector 100 may comprise a metallic body 150. Further, the optical fiber connector 100 may comprise a metallic spring 160. Further, the optical fiber connector 100 may comprise an optical fiber 180 (not explicitly shown but indicated by the opening).

FIG. 1B schematically illustrates an optical fiber connector 100 in a second view. The second view is a side view showing the optical fiber connector 100 from one of its two sides. FIGS. 1C, 7A and 7B schematically illustrate an optical fiber connector 100 and an optical fiber adapter 155 in a third view. The third view is a three dimensional view of the optical fiber connector 100. FIG. 1D schematically illustrates an optical fiber connector 100 in a fourth view. The fourth view of the optical fiber connector 100 is a front view with a direct view on one end of a metallic ferrule 180 of the optical fiber connector 100.

More details and aspects are mentioned in connection with the embodiments described above or below. The embodiment shown in FIG. 1A-1D may comprise one or more optional additional features corresponding to one or more aspects mentioned in connection with the proposed concept or one or more embodiments described below (e.g. FIG. 2-6, all characters).

FIG. 2A schematically illustrates a metallic ferrule 120 of an optical fiber connector in a first view. The first view is a three dimensional view of the metallic ferrule 120. FIG. 2B schematically illustrates a metallic ferrule 120 of an optical fiber connector in a second view. The second view further illustrates some specific and non-delimiting dimensions. FIG. 2C schematically illustrates a metallic ferrule 120 of an optical fiber connector in a third view. The third view is a longitudinal section view of the metallic ferrule 120. Further, FIG. 2C illustrates some specific and non-delimiting dimensions. FIG. 2D schematically illustrates a metallic ferrule 120 of an optical fiber connector in a fourth view. The fourth view is a side view of the metallic ferrule 120. Further, FIG. 2D illustrates some specific and non-delimiting dimensions.

More details and aspects are mentioned in connection with the embodiments described above or below. The embodiment shown in FIG. 2A to 2D may comprise one or more optional additional features corresponding to one or more aspects mentioned in connection with the proposed concept or one or more embodiments described above (e.g. FIG. 1A to 1D) or below (e.g. FIG. 3-6, all characters).

FIG. 3A schematically illustrates a metallic body 150 of an optical fiber connector in a first view. The first view is a three dimensional view of the metallic body 150. FIG. 3B schematically illustrates a metallic body 150 of an optical fiber connector in a second view. The second view is a front view of the metallic body 150. FIG. 3C schematically illustrates a metallic body 150 of an optical fiber connector in a third view. The third view is a longitudinal section view of the metallic body 150. FIG. 3D schematically illustrates a metallic body 150 of an optical fiber connector in a fourth view. The fourth view is a side view of the metallic body 150. FIG. 3E schematically illustrates a metallic body 150 of an optical fiber connector in a fifth view. The fifth view is a further side view of the metallic body 150. The metallic body 150 may further comprise a metallic elevation for the metallic body 150 to be form-fit to the plastic housing of the optical fiber connector.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g. FIG. 1-2, all characters) or below (e.g. FIG. 4-6, all characters).

FIG. 4A schematically illustrates a plastic housing 110 of an optical fiber connector in a first view. The first view is a front view of the plastic housing 110 of the optical fiber connector. FIG. 4B schematically illustrates a plastic housing 110 of an optical fiber connector in a second view. The second view is a side view of the plastic housing 110 of an optical fiber connector. FIG. 4C schematically illustrates a plastic housing 110 of an optical fiber connector in a third view. The third view is a back view of the plastic housing 110 of an optical fiber connector. FIG. 4D schematically illustrates a plastic housing 110 of an optical fiber connector in a fourth view. The fourth view is a top view of the plastic housing 110 of an optical fiber connector. FIG. 4E schematically illustrates a plastic housing 110 of an optical fiber connector in a fifth view. The fifth view is a back view of a second end portion of the plastic housing 110 of an optical fiber connector. FIG. 4F schematically illustrates a plastic housing 110 of an optical fiber connector in a sixth view. The sixth view is a longitudinal section view of the plastic housing 110 of an optical fiber connector. FIG. 4G schematically illustrates a plastic housing 110 of an optical fiber connector in a seventh view. The seventh view is a top view of a longitudinal section view of the plastic housing 110 of an optical fiber connector.

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g. FIG. 1-3, all characters) or below (e.g. FIGS. 5 and 6, all characters).

FIG. 5A schematically illustrates a metallic spring 160 of an optical fiber connector in a first view. The first view is a three dimensional view of the metallic spring 160 of an optical fiber connector. FIG. 5B schematically illustrates a metallic spring 160 of an optical fiber connector in a second view. The second view is a front/back view of the metallic spring 160 of an optical fiber connector. FIG. 5C schematically illustrates a metallic spring 160 of an optical fiber connector in a third view. The third view is a side view of the metallic spring 160 of an optical fiber connector.

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g. FIG. 1-4, all characters) or below (e.g. FIGS. 6A and 6B).

FIG. 6A schematically illustrates a metallic tube 140 of an optical fiber connector in a first view. The first view is a front/back view of the metallic tube 140 of an optical fiber connector. FIG. 6B schematically illustrates a metallic tube 140 of an optical fiber connector in a second view. The second view is a side view of the metallic tube 140 of an optical fiber connector.

More details and aspects are mentioned in connection with the embodiments described above or below. The embodiment shown in FIG. 6 may comprise one or more optional additional features corresponding to one or more aspects mentioned in connection with the proposed concept or one or more embodiments described above (e.g. FIG. 1-5, all characters) or below.

In one or more embodiments, a plastic fiber connector 100 (like LC, SC, MPO, etc.) may be used in applications which require ground connection.

In one or more embodiments, the optical fiber connector 100 may have one electric conduction clip 170 (also referred to as metallic clip). Further, the clip 170 may contact a metal part of the optical fiber connector.

Standard plastic fiber connectors (like LC, SC, MPO, etc.) may be non-electrical conductive.

Thus, the optical fiber connector 100 may be cheaper than an optical fiber connector made of solid metal (e.g., die-cast zinc or other manufacturing process). Thus, the optical fiber connector 100 is more economical.

Further, the optical fiber connector 100 is even more economical with respect to a plastic plug with a metal surface, because of the processing costs of this manufacturing step.

An optical fiber connector 100 may be used for an LED (OPF) based transceiver module (send/receive). The metal crimp ring at a standard plastic connector may for example not be grounded after installation. Further, moisture influences conductivity of an outer sheath of standard fiber connectors. Thus, the optical fiber connector may provide an EMC compatible solution.

In on one or more embodiments, the optical fiber connector may be provided with a "lightning rod".

In one or more embodiments a metal spring contact 170 may be arranged on a recess of a groove on both sides of the plastic housing 110 of the optical fiber connector 100. Further, the spring contact 170 may be connected to the crimp ring at the end of the optical fiber connector 100 and thus also to the outside sheath of a cable connected to the optical fiber connector 100. As a result, the continuous grounding of the terminated cable to the connection point may be ensured.

According to an aspect, the elements of the optical fiber connector 100 may be easy to assemble.

The application of the optical fiber connector 100 may be economically superior to the use of solid metal connectors. Another advantage may be the fact that most of the plug connectors worldwide are LC plugs. This allows all conventional applications to be earthed while using this plug (e.g., when used in computer center switches, antenna telephone connector fuses, train safety systems, airplanes, etc.).

Another advantage may be that no special equipment for special plugs like SMA is necessary to enable a connection between connector and adapter.

For example, the optical fiber connector 100 may be used in applications and situations, where technical, economical and/or spatial factors are crucial restrictions.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The present disclosure is not limited in any way to the embodiments described above. On the contrary, there are many possibilities for modifications thereof, which are apparent to an average skilled person without departing from the underlying idea of the present disclosure as defined in the appended claims.

The invention claimed is:

1. An optical fiber connector comprising:
   a plastic housing adapted to connect the optical fiber connector to an optical fiber adapter; and
   a metallic clip arranged at a side of the plastic housing, wherein the metallic clip extends from the plastic housing, wherein the metallic clip extends from a first metallic section embedded in the plastic housing at the side of the plastic housing to a second metallic section embedded in the plastic housing at the side of the plastic housing and wherein the metallic clip is adapted and arranged to press against a metallic part of the optical fiber adapter.

2. The optical fiber connector according to claim 1, wherein the first and second metallic sections are displaced from each other.

3. The optical fiber connector according to claim 1, wherein a first end of the metallic clip has an electrical connection to the first metallic section at the side of the plastic housing, and wherein a second end of the metallic clip is an open end.

4. The optical fiber connector according to claim 3, wherein the metallic clip is connected between the first end of the metallic clip and the second end of the metallic clip in an arc-like manner.

5. The optical fiber connector according to claim 1, further comprising:
   a metallic ferrule adapted to guide an optical fiber of the optical fiber connector, wherein a first end portion of the metallic ferrule extends over a first end portion of the plastic housing, and wherein a second end portion of the metallic ferrule extends in a space defined by the plastic housing.

6. The optical fiber connector according to claim 1, further comprising:
   a metallic body adapted to be connected to a ground connection via a crimp barrel, wherein a first end portion of the metallic body extends in a space defined by a second portion of the plastic housing, and wherein a second end of the metallic body extends over the second end portion of the plastic housing.

7. The optical fiber connector according to claim 6, further comprising:
   a metallic tube adapted to guide an optical fiber of the optical fiber connector, wherein a first end portion of the metallic tube is around the second end portion of the metallic ferrule, and the second end portion of the metallic body extends over a second end portion of the metallic tube.

8. The optical fiber connector according to claim 1, further comprising:
   a metallic spring arranged and adapted to enable an engagement between the metallic ferrule and the metallic body.

9. The optical fiber connector according to claim 8, wherein one end of the metallic spring is in contact with an end of the first end portion of the metallic body and on the other end of the metallic spring in contact with a part of the metallic ferrule, which part of the metallic ferrule is between the first and second portions of the metallic ferrule, and wherein the metallic spring is arranged around the first end portion of the metallic tube and the second end portion of the metallic ferrule.

10. The optical fiber connector according to claim 8, wherein the metallic spring is moveably arranged between an end of the first end portion of the metallic body and a part of the metallic ferrule, which part of the metallic ferrule is between the first and second portions of the metallic ferrule, and wherein the metallic spring is arranged around the first end portion of the metallic tube and the second end portion of the metallic ferrule.

11. The optical fiber connector according to claim 1, further comprising:
   a plastic fastener arranged on a top part of the plastic housing and adapted to arrest the optical fiber connector in or at the optical fiber adapter, which is complementary to the plastic housing of the optical fiber connector.

12. The optical fiber connector according to claim 1, further comprising:
   an optical fiber adapted to transfer optical signals, wherein any one of a metallic tube, a metallic ferrule, a metallic body, a metallic spring and a plastic housing is arranged around the optical fiber.

13. The optical fiber connector according to claim 1, further comprising:
   another metallic clip arranged at another side of the plastic housing, wherein the other metallic clip extends from the plastic housing and is adapted to press against another metallic part of the optical fiber adapter.

\* \* \* \* \*